United States Patent [19]

Warndorf

[11] Patent Number: 4,999,035
[45] Date of Patent: Mar. 12, 1991

[54] INDICATOR DEVICE FOR COMPRESSED AIR SYSTEMS

[75] Inventor: Eugene R. Warndorf, Ft. Thomas, Ky.

[73] Assignee: American Dry Air Products Company, Inc., Ft. Thomas, Ky.

[21] Appl. No.: 297,114

[22] Filed: Jan. 13, 1989

[51] Int. Cl.$^5$ ............................................. B01D 19/00
[52] U.S. Cl. ........................................ 55/275; 55/316; 116/206
[58] Field of Search .................... 55/275, 316; 116/206

[56] References Cited

U.S. PATENT DOCUMENTS

| | | | |
|---|---|---|---|
| 3,000,345 | 9/1961 | Gray et al. | 116/206 |
| 3,084,658 | 4/1963 | Schell | 116/206 |
| 3,142,287 | 7/1964 | Jones | 116/206 |
| 3,592,563 | 7/1971 | Glass et al. | 55/316 |
| 4,146,277 | 3/1979 | Sanforo | 55/275 |
| 4,278,453 | 7/1981 | Klein | 55/275 |
| 4,764,189 | 8/1988 | Yanagawa et al. | 55/163 |

Primary Examiner—Bernard Nozick
Attorney, Agent, or Firm—Roy F. Schaeperklaus

[57] ABSTRACT

A device for indicating humidity in a line. A T-fitting has a cross bar portion connected in series with the line. An upright portion of the T-fitting extends outwardly from the cross bar portion. A hollow indicator body is mounted on the upright portion with a bore in the upright portion in communication with the hollow interior of the body. An end portion of the hollow interior of the body is exposed behind a transparent plate. A chamber is formed in the hollow interior of the body, and a humidity sensitive pad in the chamber is visible through the transparent panel.

15 Claims, 2 Drawing Sheets

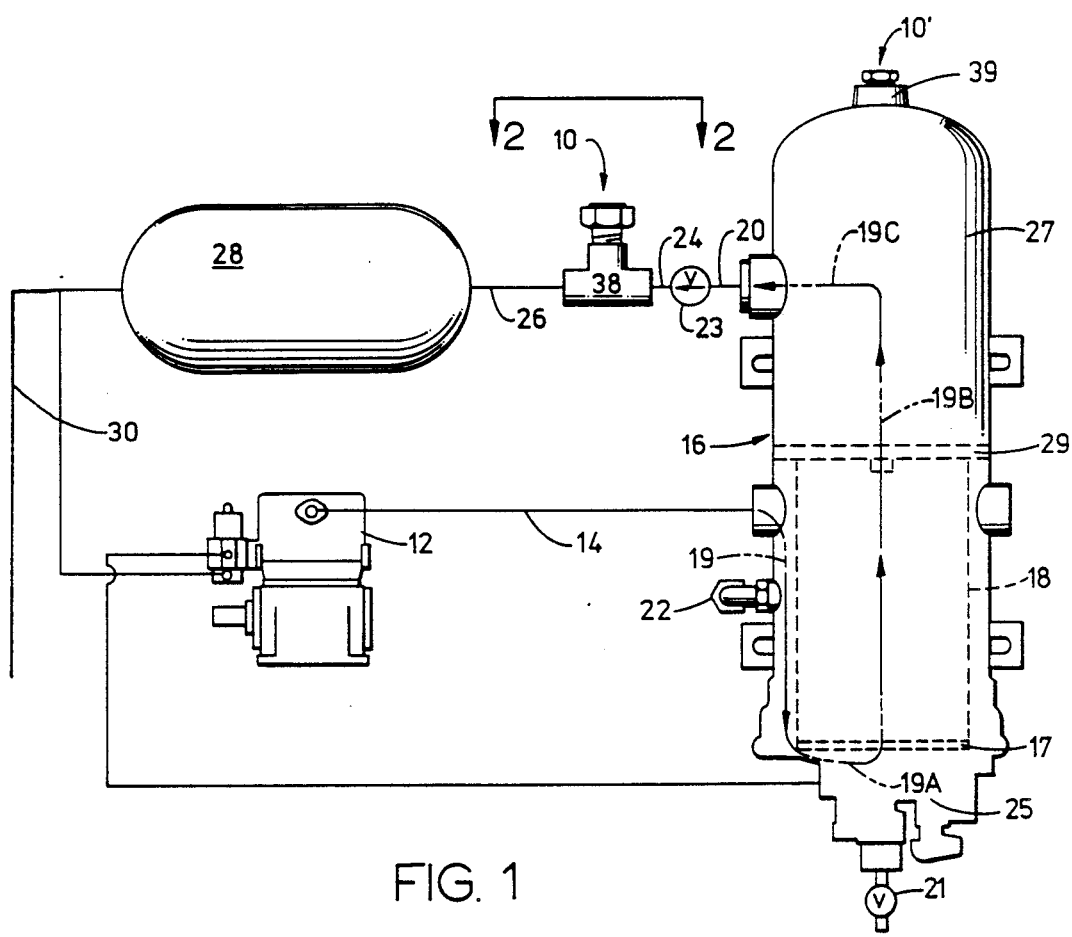
FIG. 1
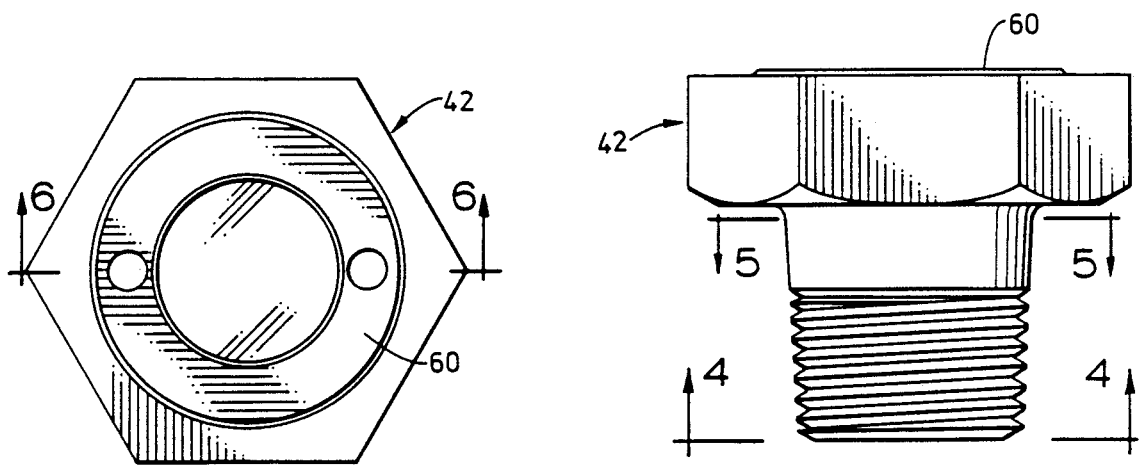
FIG. 2
FIG. 3

INDICATOR DEVICE FOR COMPRESSED AIR SYSTEMS

INDICATOR DEVICE FOR COMPRESSED AIR SYSTEMS

This invention relates to compressed air systems. More particularly, this invention relates to an air drying system for air brakes and an indicator device for indicating that the air is sufficiently dried to function properly in the air brake system.

An object of this invention is to provide an indicator device which can be mounted in a line of an air brake system and which indicates the degree of wetness of air passing through the line is greater or less than a predetermined value.

BACKGROUND OF THE INVENTION

Many large vehicles, of both off-road and over-the-road types, are equipped with air brakes. When compressed atmospheric air of varying relative humidity and initial atmospheric temperature is charged into such systems from a compressor, it contains moisture in the form of water vapor and condensed air-borne water droplets, as well as dust and other entrained air-borne foreign (non-air) matter. As the air delivered into the system from the compressor at above ambient atmospheric temperature cools to ambient atmospheric temperature, and as the entire system cools with decrease in atmospheric temperature, additional water vapor may condense in the system if conditions are right for such. Drain fittings are usually incorporated in such systems at locations where water, oil and other foreign matter tend to accumulate, so that upon opening of the particular drains, the water, oil and foreign matter are removed from the pressurized system at the drain points to preclude brake failure due to freezing of water in the air lines, or failure of brake parts due to the effects of water, oil or other foreign matter.

Devices popularly called Air Dryers are now incorporated between the compressor and the first air reservoir in many such systems to remove water, water vapor, oil and entrained particulate foreign matter. The air flow supplied by the compressor is by the dryer forced to flow downward and undergo deceleration and at the lower end of the dryer make a 180° turn (to promote non-gaseous matter to fall out of the air stream into a trap) and then flow successively upward through an oil filter (to remove entrained oil and foreign matter), a desiccant cartridge containing about a pound of desiccant beads having about two million square feet of adsorbtive area (to adsorb moisture), through a desiccant seal plate, a purge chamber and a check valve into a line to a first reservoir. The system has a two-cycle operation. In the compression cycle, the compressor supplies compressed air through the dryer to the first reservoir until the desired system pressure is reached and the governor cuts out, pressurizing the unloader cavity of the compressor (placing the compressor in its non-compressing cycle) and pressurizing the purge valve in the bottom of the air dryer to open the valve to vent the air dryer sump trap to atmosphere. Contaminants in the line from the compressor to the sump trap of the air dryer are exhausted to the atmosphere through the open valve as the line pressure falls to atmospheric, while dried air in the purge chamber expands providing a reverse air flow across (down through) the desiccant to remove water and strip water vapor from the desiccant as the pressure in the air dryer falls to atmospheric. In use the desiccant becomes progressively saturated from bottom (air inflow from compressor end) toward the top until there is insufficient desiccant to adsorb moisture and water vapor from the air to dry it to the desired level. Before that level of operation is reached, the cartridge should be replaced. While for desiccant cartridge service life, preferred operating conditions are a compression cycle of 90 seconds or less, and a purge cycle of 30 seconds or more, the desiccant cartridge service life can vary widely with the actual operating conditions and atmospheric conditions under which it is used. In a dry dessert climate its life can be long, in a wet tropical climate it can be much shorter, and the service life in a vehicle operated in varying climates is not easily forecast. Similarly, leaks in a system or abnormal usage producing increased throughput of air, also affects the service life of the desiccant cartridge. However, the cartridge is located inside of a device having a steel case where it is not visible until the device, with the expenditure of some labor and time is disassembled. As a result, the timing of cartridge replacement to coincide with the end of cartridge service life has been a compromise of cost of labor, safety considerations and cost of waste of unused desiccant to arrive at a desiccant cartridge change schedule based on a factor such as operating hours, or miles driven, or a calendar period as assures change before exhaustion of the desiccant would occur under normal use, with perhaps a safety factor allowance included. The course of events, however, does not always follow such assumption based schemes and the practice is unreliable. If desiccant is changed unnecessarily, unnecessary cost results, but if it is not changed when it should be, fatal danger could be involved.

BRIEF STATEMENT OF THE INVENTION

Briefly, this invention provides an indicator device which can be mounted on a fitting downstream of air drying desiccant in an air brake system. The device includes a hollow body member threaded in an upright fitting in the wall of the purge chamber or an upright arm of a T-fitting in a line of an air brake system downstream from the desiccant. A plug of absorbent material, such as absorbent cotton, is mounted inside the hollow body member and is held in place therein by spider members at opposite ends of the plug. The spider members grip the inside surface of the body member. One end of the plug is exposed to air flowing in the air line. The other end of the plug is exposed to a chamber in the hollow body member. The chamber holds an indicator pad which can be formed of blotting paper or the like and which is impregnated with an appropriate indicator chemical to reveal when the humidity in the chamber changes through a selected value. A transparent window overlies the chamber and the indicator pad so that the indicator pad can be observed without being exposed to ambient air.

BRIEF DESCRIPTION OF THE DRAWINGS

The above and other objects and features of the invention will be apparent to those skilled in the art to which the invention pertains from the following detailed description and the drawings, in which:

FIG. 1 is a schematic view of an air brake system embodying an indicator device constructed in accordance with an embodiment of this invention;

FIG. 2 is a plan view of a hollow body member of the device looking in the direction of the arrows 2—2 in FIG. 1;

FIG. 3 is a view in side elevation of the hollow body member;

In the following detailed description and the drawings, like reference characters indicate like parts.

DESCRIPTION OF PRESENTLY PREFERRED EMBODIMENT OF THE INVENTION

Figure 4:
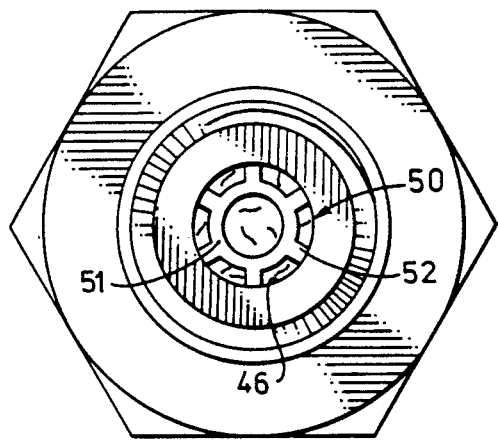
FIG. 4 is a bottom plan view of the hollow body member looking in the direction of the arrows 4—4 in FIG. 3.
Figure 5:
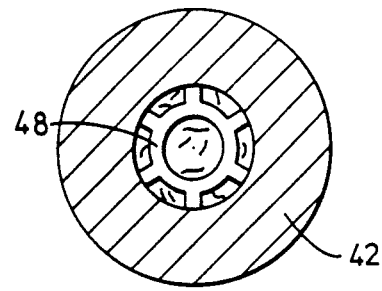
FIG. 5 is a view in section taken on the line 5—5 in FIG. 3.

In FIG. 1 is shown an air drying portion of an air brake system which includes an indicator device 10 or 10′ constructed in accordance with an embodiment of this invention. Air from a compressor 12 passes through a line 14 to an air drying or desiccating tower 16. The tower 16 can be of the type known as SD-08-2 (a trademark of Allied-Signal Inc.). The tower 16 encloses an oil filter 17 and a cartridge 18 of desiccant particles through which the air is directed to dry the air. The path of the air is indicated by arrows 19, 19A, 19B, and 19C. The air travels through a passageway (arrow 19) into the bottom sump trap 25 of tower 16 below oil filter 17, then upwardly through the oil filter 17, the interior of the cartridge 18 (arrow 19A), upwardly through a purge chamber 27 in the upper portion of the tower 16 (arrow 19B) and outwardly to a line 20 (arrow 19C). Water and particulate material which can collect in the lower portion of the tower 16 can be discharged through a valve 21 at the bottom of the tower 16. A safety valve 22 protects the tower 16 from excessive pressure. From the tower 16, the dried air passes through the line 20, a check valve 23, a line 24, a T-fitting 38 with the indicator device 10 mounted therein, and a line 26 to a first reservoir or storage tank 28. From the storage tank 28, the air can pass through a line 30, which can be connected to air brake equipment, not shown in detail. The structure described to this point can be of usual construction with the exception of the indicator device 10.

Figure 6:
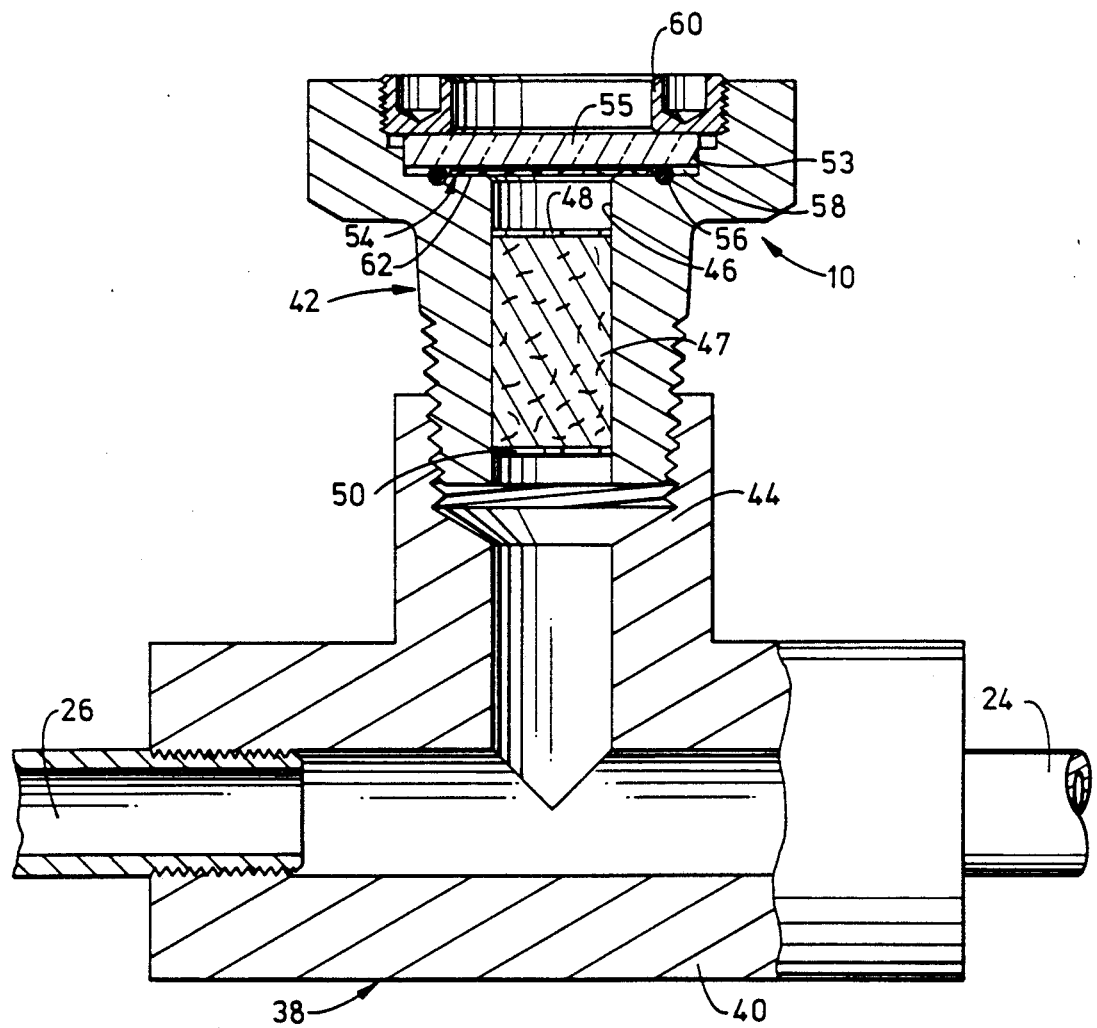
FIG. 6 is a view partly in section taken on the line 6—6 in FIG. 2 and partly in elevation.

The indicator device 10 is mounted on a T-fitting 38 (FIG. 6). A cross bar portion 40 of the T-fitting 38 is connected in series between the lines 24 and 26. A body portion 42 of the indicator device 10 is threaded in an upright portion 44 of the T-fitting 38, or the corresponding portion of a like device 10′ may be mounted in a fitting 39 in the top wall of the purge chamber 27 of air drying tower 16. The body portion 42 is provided with a main bore 46 in which a plug 47 of absorbent cotton or the like is mounted. Spider plates 48 and 50 mounted in the main bore 46 hold the plug 47 in position. As shown in FIG. 4, the spider plate 50 includes a ring-shaped body 51 and outwardly directed arms 52. Outer ends of the arms 52 engage walls of the main bore 46. The spider plate 48 is of similar construction. The plug 47 serves to capture any solid or liquid material which can travel along the cross bar portion 40 and into the main bore 46. A counterbore portion 53 (FIG. 6) of the main bore 46 provides a chamber 54 at an upper end of the body portion 42. A plate 55 of transparent material, such as clear glass, closes the chamber 54. An O-ring seal 56 rests on a shoulder 58 in the counterbore portion 53 and is engaged by the glass plate 55. A ring closure 60 is threaded in the counterbore portion 53 and holds the glass plate 55 in engagement with the O-ring seal 56. A piece or pad 62 of blotting paper is mounted between the glass plate 55 and the shoulder 58 inside the O-ring seal 56 and in communication with the main bore 46. The piece 62 of blotting paper is loosely mounted in the chamber 54. The blotting paper can be impregnated with an appropriate humidity sensitive material, such as cobaltous chloride, which will change color in response to change in relative humidity through a predetermined relative humidity value, such as 30% or other value as desired. The blotting paper can be inspected through the glass plate 55, and the color of the blotting paper provides an indication of the humidity of the output from the tower 16.

The indicator device described above and illustrated in the drawings is subject to structural modification without departing from the spirit and scope of the appended claims.

Having described my invention, what I claim as new and wish to secure by letters patent is:

I claim:

1. The combination an air compressor, a desiccating tower receiving compressed air from the compressor, a storage tank, first line means connecting the desiccating tower to the storage tank, and second line means connecting the storage tank to the compressor with an upright fitting connected to the first line means downstream of desiccant in the desiccating tower, an indicator device connected to the upright fitting, a hollow indicator body mounted on the upright fitting with a bore in the upright fitting in communication with the hollow interior of the hollow body, an end portion of the hollow interior of the body being exposed, a transparent plate closing the exposed end portion, means for holding the transparent plate in position closing the exposed end portion, a chamber being formed in the hollow interior of the body portion, and a humidity sensitive indicator pad in the chamber visible through the transparent plate.

2. A combination as in claim 1 in which the desiccating tower has a purge chamber downstream of the desiccant and the hollow interior of the hollow body mounted on the upright fitting portion is in communication with the purge chamber.

3. A combination as in claim 1 in which the upright fitting portion is the stem of a T-fitting having the crossbar portion thereof connected in series between the desiccating tower and the storage tank.

4. The combination of an air compressor, a desiccating tower receiving compressed air from the compressor, a storage tank, first line means connecting the desiccating tower to the storage tank, and second line means connecting the storage tank to the compressor with an upright fitting connected to the first line means downstream of desiccant in the desiccating tower, an indicator device connected to the upright fitting, a hollow indicator body mounted on the upright fitting with a bore in the upright fitting in communication with the hollow interior of the hollow body, an end portion of the hollow interior of the body being exposed, a transparent plate closing the exposed end portion, means for holding the transparent plate in position closing the exposed end portion, a chamber being formed in the hollow interior of the body portion, a humidity sensitive indicator pad in the chamber visible through the transparent plate, and a plug of porous material disposed in the bore of the body for catching liquid and solid material from compressed air moving through the hollow body toward the indicator pad.

5. The combination of an air compressor, a desiccant container and line means connected to the air compressor and to the desiccant container with a device for indicating humidity downstream of the air compressor and the desiccant container which comprises a hollow upright fitting portion extending outwardly from the line means, a hollow indicator body mounted on the upright fitting portion with the interior of the hollow body in communication through a bore in the upright fitting portion with the interior of the line means, an end portion of the hollow of the body being exposed, a transparent plate closing the exposed end portion, means for holding the transparent plate in position closing the exposed end portion, a chamber being formed in the hollow interior of the body portion, and a humidity sensitive indicating pad in the chamber visible through the transparent plate.

6. The combination of an air compressor, a desiccant container, and line means connected to the air compressor and to the desiccant container with a device for indicating humidity downstream of the air compressor and the desiccant container which comprises a hollow upright fitting portion, a hollow indicator body mounted on the upright portion with a bore in the upright portion in communication with the line means and the interior of the hollow body, an end portion of the hollow body being exposed, a transparent member closing the exposed end portion, means for holding the transparent member in position closing the exposed end portion, a chamber being formed in the hollow interior of the body portion, a humidity sensitive indicator pad in the chamber visible through the transparent member, and the humidity sensitive pad exhibiting an appearance indicating the humidity of air in the line relative to a predetermined relative humidity value.

7. A device for indicating humidity in a portion of a compressed air system relative to a predetermined relative humidity value which comprises an upright portion extending outwardly from a compressed air containment portion of the system, a hollow indicator body mounted on the upright portion with a bore in the upright portion in communication with the interior of the system and the interior of the hollow body, an end portion of the hollow body being exposed, a transparent member closing the exposed end portion, means for holding the transparent member in position closing the exposed end portion, a chamber being formed in the hollow interior of the body portion, a humidity sensitive indicator pad in the chamber visible through the transparent member, a plug of porous material in the hollow indicator body and spaced from the sensitive pad to catch liquid and solid material in air in the line means before it can reach the sensitive pad, and the humidity sensitive pad exhibiting an appearance indicating the humidity of air in the line relative to a predetermined relative humidity value.

8. A combination as in claim 7 in which the upright portion is a branck of line means connecting in series the desiccant container and a storage tank.

9. The combination of an air compressor, a desiccating tower receiving compressed air from the compressor, a storage tank for storing compressed air line means connecting the desiccating tower to the storage tank, and line means connecting the storage tank to the compressor with an indicator device connected to one of the line means which comprises a T-fitting which includes a cross bar portion connected in series with said one of the line means and an upright portion extending outwardly from the cross bar portion, a hollow indicator body mounted on the upright portion with a bore in the upright portion in communication with the hollow interior of the hollow body, an end portion of the hollow interior of the body being exposed, a transparent plate closing the exposed end portion, means for holding the transparent plate in position closing the exposed end portion, a chamber being formed in the hollow interior of the body portion, and a humidity sensitive pad in the chamber visible through the transparent plate.

10. The combination of an air compressor, a desiccating tower receiving compressed air from the compressor, a storage tank, line means connecting the desiccating tower to the storage tank, and line means connecting the storage tank to the compressor with an indicator device connected to one of the line means which comprises a T-fitting which includes a cross bar portion connected in series with said one of the line means and an upright portion extending outwardly from the cross bar portion, a hollow indicator body mounted on the upright portion with a bore in the upright portion in communication with the hollow interior of the hollow body, an end portion of the hollow interior of the body being exposed, a transparent plate closing the exposed end portion, means for holding the transparent plate in position closing the exposed end portion, a chamber being formed in the hollow interior of the body portion, a plug of porous material disposed in the bore of the body for catching liquid and solid material from said one of the lines, and a humidity sensitive pad in the chamber visible through the transparent plate.

11. A combination as in claim 10 in which the cross bar portion of the T-fitting is connected in series between the desiccating tower and the storage tank.

12. A device for indicating humidity in a line which comprises a T-fitting which includes a cross bar portion connected in series with the line, an upright portion extending outwardly from the cross bar portion, a hollow indicator body mounted on the upright portion with a bore in the upright portion in communication with the interior of the hollow body, an end portion of the hollow of the body being exposed, a transparent plate closing the exposed end portion, means for holding the transparent plate in position closing the exposed end portion, a chamber being formed in the hollow interior of the body portion, a humidity sensitive pad in the chamber adjacent and visible through the transparent plate, and a plug of porous material in the hollow indicator body spaced from the T-fitting and from the sensitive pad to catch liquid and solid material from the T-fitting before it can reach the sensitive pad.

13. A device for indicating humidity in a line relative to a predetermined relative humidity value which comprises a T-fitting which includes a cross bar portion connected in series with the line, an upright portion extending outwardly from the cross bar portion, a hollow indicator body mounted on the upright portion with a bore in the upright portion in communication with the interior of the line and the interior of the hollow body, an end portion of the hollow of the body being exposed, a transparent member closing the exposed end portion, means for holding the transparent member in position closing the exposed end portion, a chamber being formed in the hollow interior of the body portion, a humidity sensitive pad in the chamber visible through the transparent member, a plug of porous material in the hollow indicator body spaced from the T-fitting and from the sensitive pad to catch liquid and solid material from the T-fitting before it can reach the sensitive pad, and the humidity sensitive pad exhibiting an appearance indicating the humidity of air in the line relative to a predetermined relative humidity value.

14. A combination as in claim 13 in which the cross bar portion of the T-fitting is connected in series in a line between the desiccating tower and the storage tank.

15. A device for indicating humidity in a line relative to a predetermined relative humidity value which comprises a T-fitting which includes a cross bar portion connected in series with the line, an upright portion extending outwardly from the cross bar portion, a hollow indicator body mounted on the upright portion with a bore in the upright portion in communication with the interior of the line and the interior of the hollow body, an end portion of the hollow of the body being exposed, a transparent member closing the exposed end portion, means for holding the transparent member in position closing the exposed end portion, a chamber being formed in the hollow interior of the body portion, a humidity sensitive pad in the chamber visible through the transparent member, a plug of porous material in the hollow indicator body and spaced from the line and from the sensitive pad to catch liquid and solid material from the said line before it can reach the sensitive pad, and the humidity sensitive pad exhibiting an appearance indicating the humidity of air in the line relative to a predetermined relative humidity value.

* * * * *